(12) United States Patent
David et al.

(10) Patent No.: US 7,160,347 B2
(45) Date of Patent: Jan. 9, 2007

(54) WASTE SEPARATING DEVICE FOR VACUUM CLEANER

(75) Inventors: Fabien David, Notre Dame de l'Isle (FR); Paul Dancer, Irigny (FR)

(73) Assignee: SEB S.A., Ecully (FR)

( * ) Notice: Subject to any disclaimer, the term of this patent is extended or adjusted under 35 U.S.C. 154(b) by 284 days.

(21) Appl. No.: 10/497,706

(22) PCT Filed: Nov. 29, 2002

(86) PCT No.: PCT/FR02/04111

§ 371 (c)(1),
(2), (4) Date: Jun. 4, 2004

(87) PCT Pub. No.: WO03/047412

PCT Pub. Date: Jun. 12, 2003

(65) Prior Publication Data

US 2005/0091945 A1    May 5, 2005

(30) Foreign Application Priority Data

Dec. 5, 2001 (FR) .................................. 01 15715

(51) Int. Cl.
*B01D 45/12* (2006.01)
*B01D 50/00* (2006.01)
(52) U.S. Cl. ...................... 55/337; 55/459.1; 55/459.5; 55/467; 55/DIG. 3
(58) Field of Classification Search ................. 55/337, 55/459.1, 459.5, 467, DIG. 3
See application file for complete search history.

(56) References Cited

U.S. PATENT DOCUMENTS 2,578,568 A * 12/1951 Mayer et al. ................ 96/210
4,585,466 A * 4/1986 Syred et al. ................. 55/349
6,260,234 B1   7/2001 Wright et al.
6,484,350 B1 * 11/2002 Yung ......................... 15/327.1
6,712,868 B1 *  3/2004 Murphy et al. .............. 55/330

FOREIGN PATENT DOCUMENTS

| DE | 197 04 468 | 8/1998 |
| DE | 199 38 774 | 3/2001 |
| DE | 100 00 984 | 7/2001 |
| EP | 0 489 468 | 6/1992 |
| JP | 4-288111 | 10/1992 |
| WO | WO 96/27446 | 9/1996 |
| WO | WO 01/14066 | 3/2001 |

* cited by examiner

Primary Examiner—Robert A. Hopkins
(74) Attorney, Agent, or Firm—Browdy and Neimark, PLLC

(57) ABSTRACT

The invention concerns a device for separating and collecting waste driven by an air stream, comprising an intake duct (52) emerging along a tangential direction in a waste separating chamber (53) defining an internal volume having substantially the shape of a cylinder, in the central part of said chamber (53) is arranged at least an opening (61, 63) emerging onto a duct connected to a suction unit, said chamber (53) having a channel (68) for evacuating waste along a radial direction, said channel (68) being connected to a sealed pan (76) collecting centrifuged waste, the air intake channel (52) and the waste evacuating channel (68) being arranged substantially at the same height in the waste separating chamber (53). The invention is characterized in that the diametrical section of the chamber (53) ranges between twice and ten times the smallest cross-section of the channel carrying waste from the nozzle.

22 Claims, 8 Drawing Sheets

Figure 2:
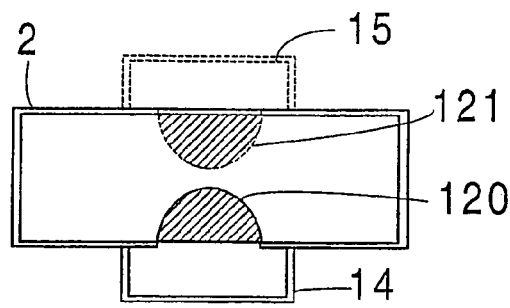

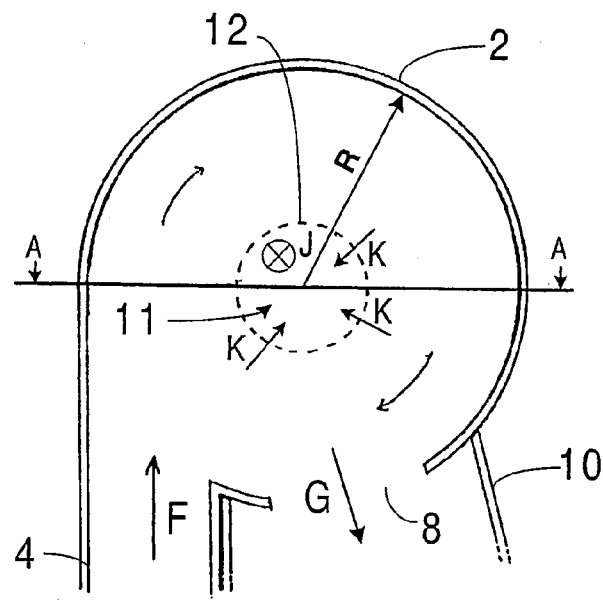
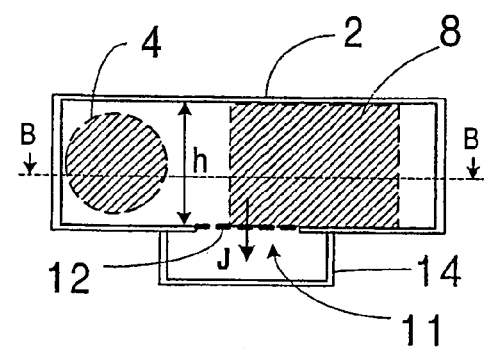
FIG.1a  FIG.1b
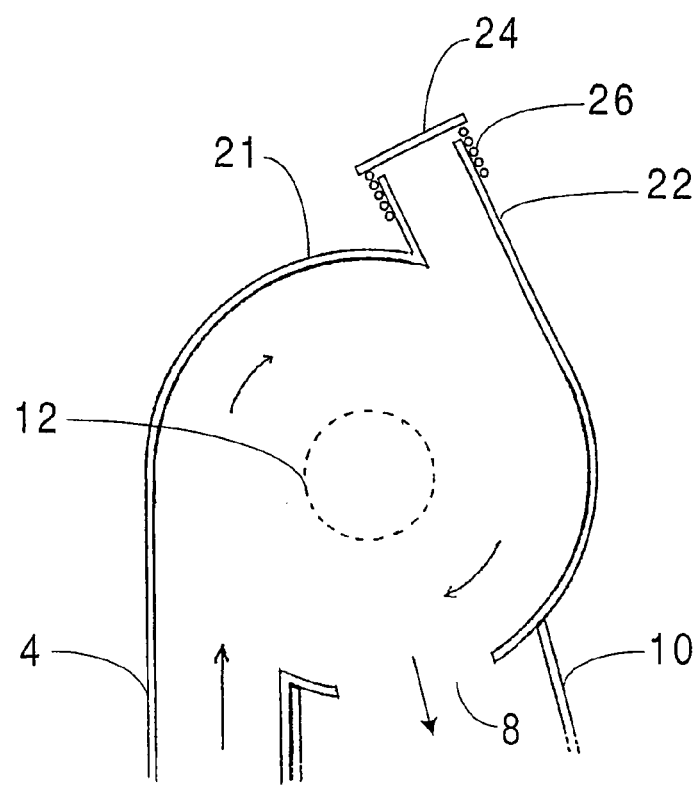
FIG.3

WASTE SEPARATING DEVICE FOR VACUUM CLEANER

The present invention concerns waste recovery appliances of the vacuum cleaner type, and more particularly those using a separation of the waste by centrifuging.

It is known, in vacuum cleaners, to separate the suctioned waste from the air stream by placing said flow into rotation, the heavier waste being then separated from the air stream by centrifuging.

The document WO 96/27446 describes a device for separating waste where the air enters tangentially into a cylindrical receptacle at the center of which is housed a filter connected to the suction group. The waste entrained in rotation in this receptacle is separated from the initial air stream and falls to the bottom of said receptacle.

The presence of the location for storage of the waste in the chamber for separation of said waste generates a rather significant bulk for the device. In addition, as mentioned in said document, optimal functioning of the device requires the presence of zones for halting rotation of the waste, in order that it is not re-entrained toward the filtration zone.

By the document EP 0 489 468, there is equally known a series arrangement of two filtration systems, the first system permitting halting the largest waste by a filtering sieve device, the second system being of the cyclonic type by including a cylindrical separation chamber, of relatively small size at the center of which is housed a conduit for return of purified air. This arrangement is, however, bulky and the two filtration systems form a relatively complex architecture.

One of the goals of the present invention is to overcome the drawbacks of the prior art by reducing particularly the bulkiness of the general device for filtration by centrifuging, without reducing the efficiency of separation of the waste, while simplifying the architecture.

This goal is achieved with the aid of a main device for separating and collecting waste entrained by an air stream generated by a suction group of a vacuum cleaner, said device comprising an air intake duct emerging along a tangential direction in a waste separating chamber defining an internal volume having substantially the shape of a cylinder, in the central part of said chamber is arranged at least one opening emerging into a duct connected to the suction group, said chamber having a channel for evacuating waste along a radial direction, said channel being connected to a sealed tank collecting centrifuged waste, the air intake channel and the waste evacuating channel being arranged substantially at the same height in the waste separating chamber, characterized in that the diametral cross-section of the chamber is comprised between two times and ten times the smallest cross-section of the channels carrying waste from the nozzle.

By the term diametral cross-section, there is intended the cross-section of the chamber taken along its diameter.

In effect, during operation, the air stream is centrifuged upon entry into the separation chamber, and thus follows a circular movement in taking the form of a centrifuging vein the cross-section of which is at most equal to one-half of the cross-section of the chamber taken along its diameter.

In order to provide a rather unusual compactness for a main device for separating waste while retaining a substantial speed of the air stream, it is desirable that the cross-section of this circulation vein of the air stream is comprised between one time and five times the cross section of the intake duct.

In addition, the stream being led, depending on the case, to effectuate more than one revolution of the separation chamber, to the entering stream there will be added the residual stream already present in the chamber. It is thus important to take this into account in connection with dimensioning of said chamber. Finally, by only increasing very little the diametral cross-section of the chamber with respect to the cross-section of the intake duct, perturbation of the stream at the entrance to the separation chamber is limited.

In addition, by this arrangement, one can in particular reduce the centrifuging zone in the direction transverse to the direction of introduction of the waste, i.e. if the waste is introduced horizontally, the height of the separation chamber is reduced. This reduction in the bulk is possible by physical isolation of the receptacle for storing waste from the active separation chamber, connected solely to said chamber by a connecting channel. This also permits a greater freedom with regard to the form of the storage receptacle and its implementation since it is then no longer indispensable that this latter be cylindrical.

Moreover, by diminishing the height of the separation chamber, load losses associated with the device are reduced.

Advantageously, at least one filtration means is disposed in the central part of the chamber and separates the internal volume of said chamber from the duct connected with the suction group which permits better confinement of waste in the separation chamber, thus reducing the different locations for storing waste.

According to the configurations envisioned, the filtration means can take different forms and can come in the form of a grid, in the form of a filter, of a sponge, of a bag, . . . Several forms can be associated in order to constitute said filtration means.

Advantageously, the end of the waste evacuating channel connected to the separation chamber has a height substantially equal to that of the chamber, thus not having any zone where the waste can stop on the walls delimiting the openings of the waste evacuating channel.

Advantageously, the cross-section of the intake duct is substantially circular and of a diameter comprised between 25 mm and 35 mm, which is very close to the values currently used in various existing vacuum cleaner pipes, always in order to take care to retain a high speed of the air stream at its intake into the separation chamber.

It is in effect important to underline that the separation device is only truly efficient for airspeeds in the chamber greater than 30 m/s and preferably greater than 50 m/s.

Advantageously, the duct for intake of air into the separation chamber has a reduction of its cross-section at the level of the aeraulic connection with said separation chamber, which permits the air to be accelerated at its intake into the separation chamber.

More precisely, the cross-section of the air intake duct is comprised between 1 and 2 times the smallest cross-section for conveying the waste from the suction nozzle. As has been recalled previously, the internal diameter of the pipes connecting the nozzle to the housing of the vacuum cleaner being generally comprised, in a majority of canister vacuum cleaners, between 25 mm and 30 mm, the cross-section of the channel for the intake of air into the separation chamber is then comprised between around 490 and 1400 $mm^2$.

Thus, by providing an air intake cross-section into the separation chamber of the same value, or even a value lower than the cross-section for conducting waste from the nozzle, there can be maintained a substantial speed for the waste, or even an acceleration, at its intake and consequently at the interior of the separation chamber.

According to a first embodiment, one of the filtration means is flat, being housed at the end of a duct connected to the main suction group. This arrangement is helpful for reducing even more the size of the separation device.

According to a second embodiment, one of the filtration means is hemispherical, which permits retention of a compact form for the device while presenting a filter size larger than that of a flat filter.

In a variant of the construction of these two embodiments, the device for separation of the waste has two filtration means disposed facing one another, in relation with one or two ducts linked to the main suction group, which permits an increase in the filtration surface area and the efficiency of separation of the waste, by splitting the air stream in two.

According to a third embodiment, at least one filtration means is cylindrical.

The cylindrical form given to the filtration means permits limiting of the turbulence of the air stream in the separation chamber, as well as the zones where waste is retained in the chamber.

Preferably, one of the filtration means extends from the bottom of the separation chamber up to the upper part of said chamber, which permits a substantial filtration surface area to be provided.

According to a fourth embodiment, the cylindrical separation chamber is in the form of a torus, the inner cylindrical face of which has an opening that opens onto a duct in communication with a suction group.

The construction of such a chamber, in presenting a rigid inner face, permits the separation chamber to be delimited independently of the filtration means, which permits a greater latitude with regard to construction of the device.

Advantageously, a filtration means is disposed at the level of the opening of the inner cylindrical face, for the purpose of halting as much as possible of the waste in a given location.

Advantageously, the diametral cross-section of the torus is comprised between 1 time and 4 times the smallest cross-section of the ducts conducting the waste from the nozzle, permitting a substantial air speed to be maintained, as previously explained.

Advantageously, the filtration means is a grid of which the mesh size is smaller than 60 μm, permitting protection of all of the downstream part, comprising the main suction group with, possibly, a final filter.

Advantageously, the inner cylindrical face is extended above the height of the separation chamber, the cylinder thus characterized being closed by substantially horizontal walls, defining a volume at the interior of which is housed a second filtration means communicating with the main suction group.

The arrangement of these two filtration means in this space permits, on the one hand, the compactness of the device to be increased, while confining, on the other hand, in a same place, the means for filtration and for collecting waste relative to the separation device. Moreover, by disposing these two filtration means sufficiently far from one another at the center of the torus, there is liberated a substantial volume for storing fine waste between these two filtration means.

Advantageously, the second filtration means is a cylindrical filter extending over substantially all of the height of the cylinder, thus permitting the filtration surface area to be augmented, which delays clogging of said filter.

In a variant of construction, the second filtration means is present in the form of a filter disposed in a housing situated under the separation chamber and in aeraulic communication therewith. Such an arrangement permits the architecture of the appliance to be simplified while offering a large latitude with regard to construction of the filter.

Advantageously, the filter has a surface area greater than 0.2 m$^2$, essentially by increasing its diameter and/or its height, or by use of a pleated filter.

In an improved version of one of the embodiments mentioned, at least on of the filtration means can be renewed, which facilitates care of the device. By the term renewed, one means that the means can undergo a treatment to recover its functions and its qualities close to the original. Such treatments encompass washing, shaking out the filter, . . .

Advantageously, in order to facilitate such a renewal, the filter is constituted by a fibrous support covered with a porous membrane of PTFE. Such a filter can thus be cleaned by a simple washing in water.

Figure 4A:
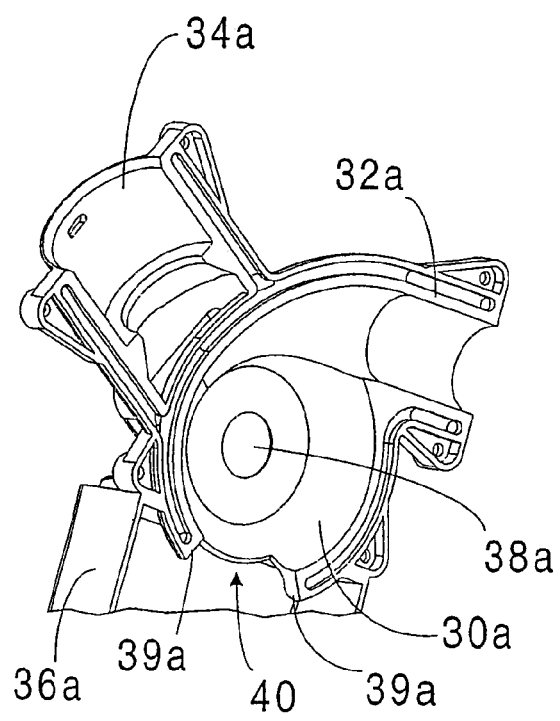
Figure 4B:
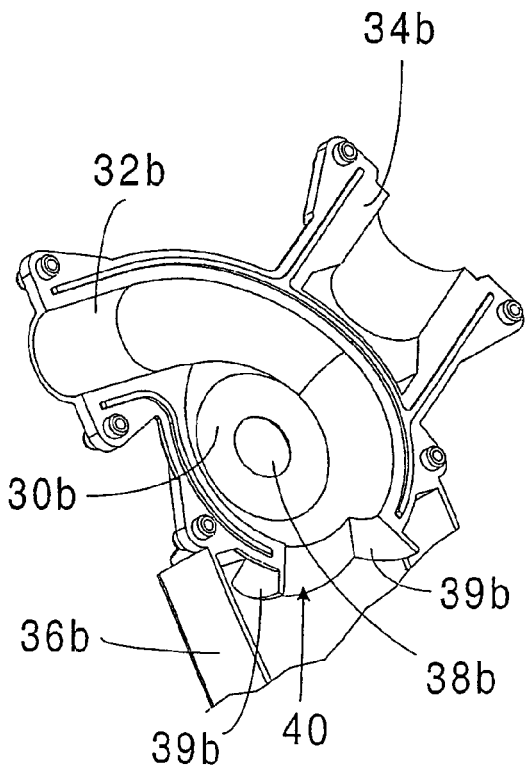
Figure 5:
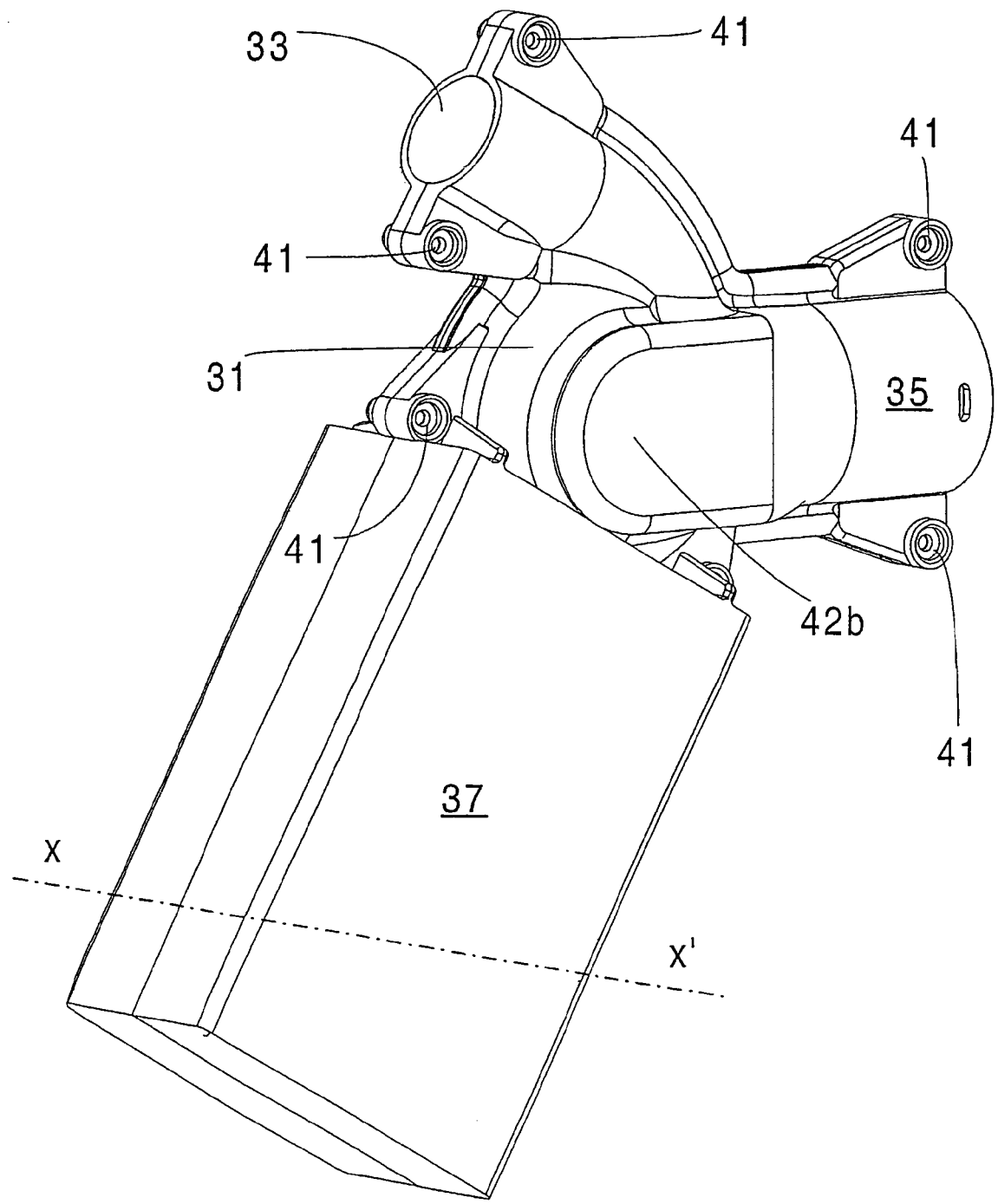
Figure 6:
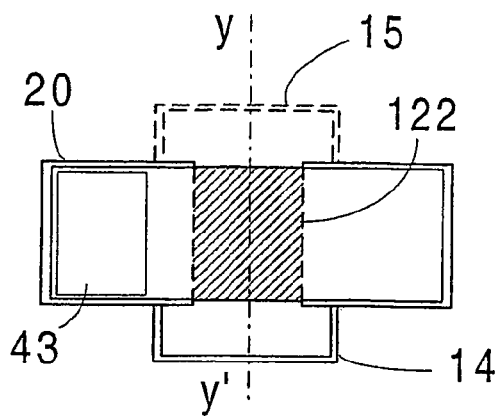
Figure 7:
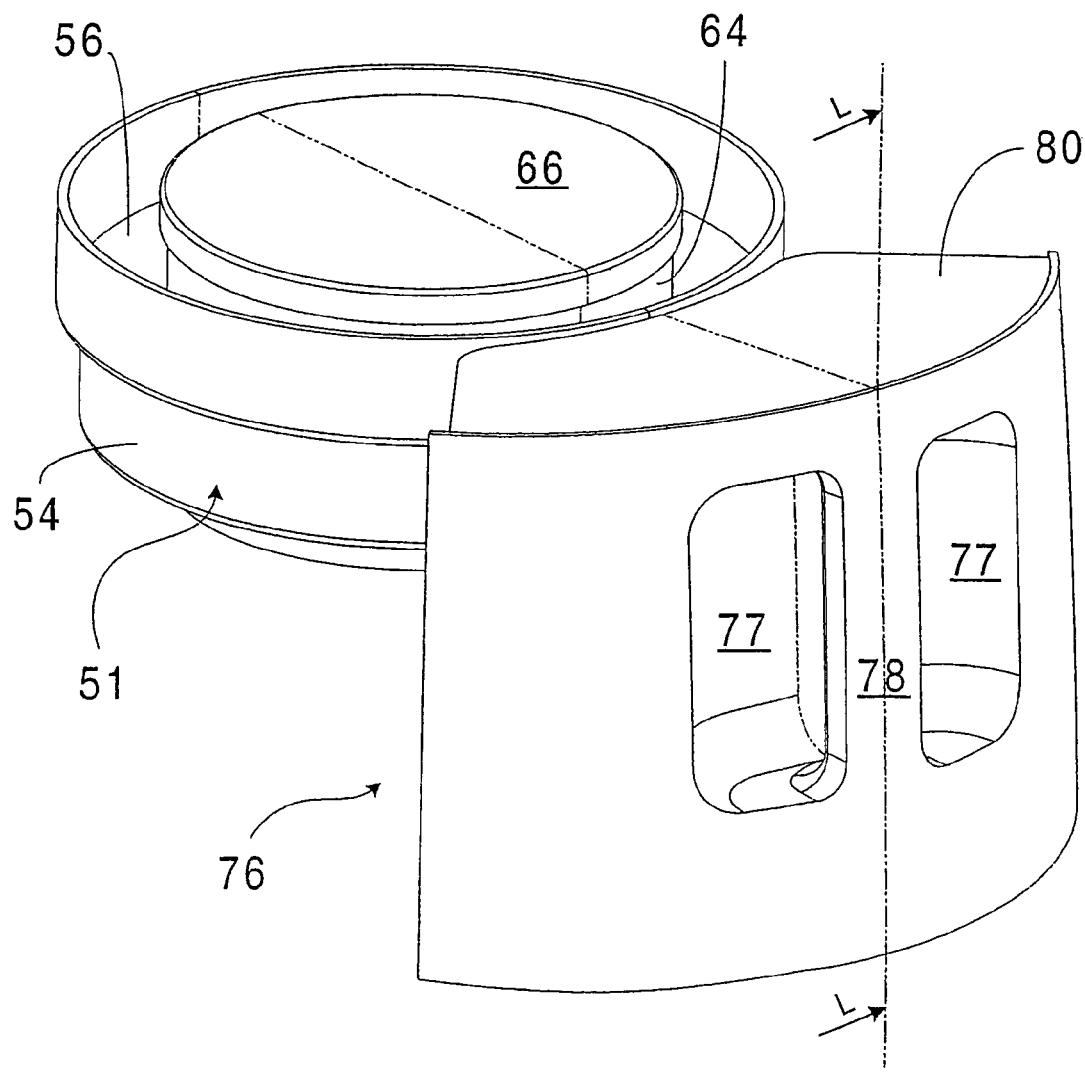
Figure 8:
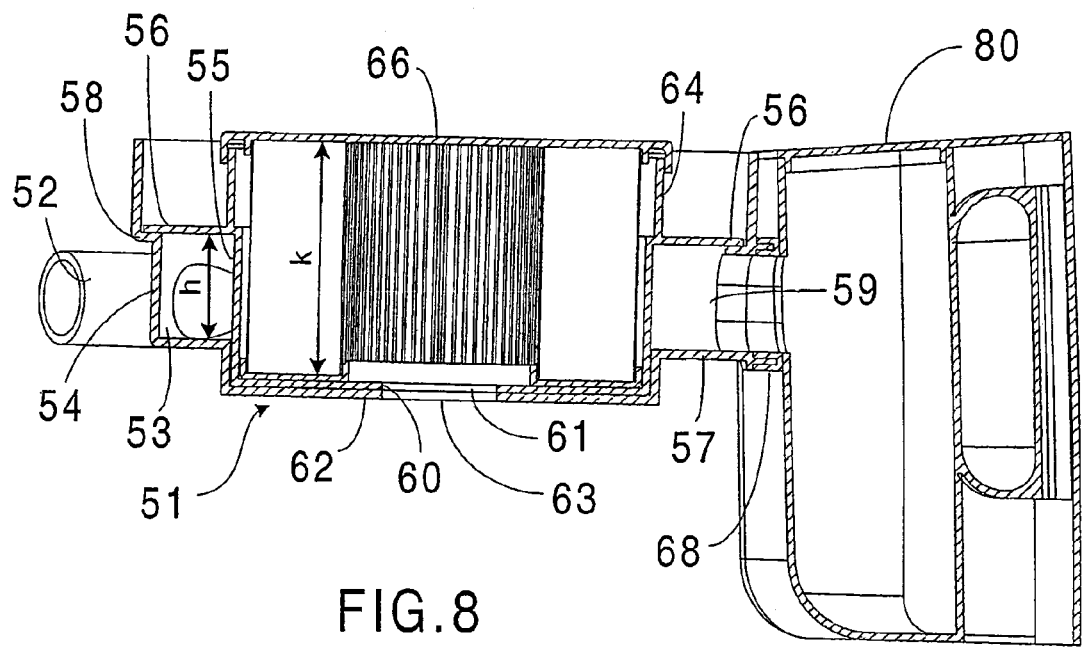
Figure 9:
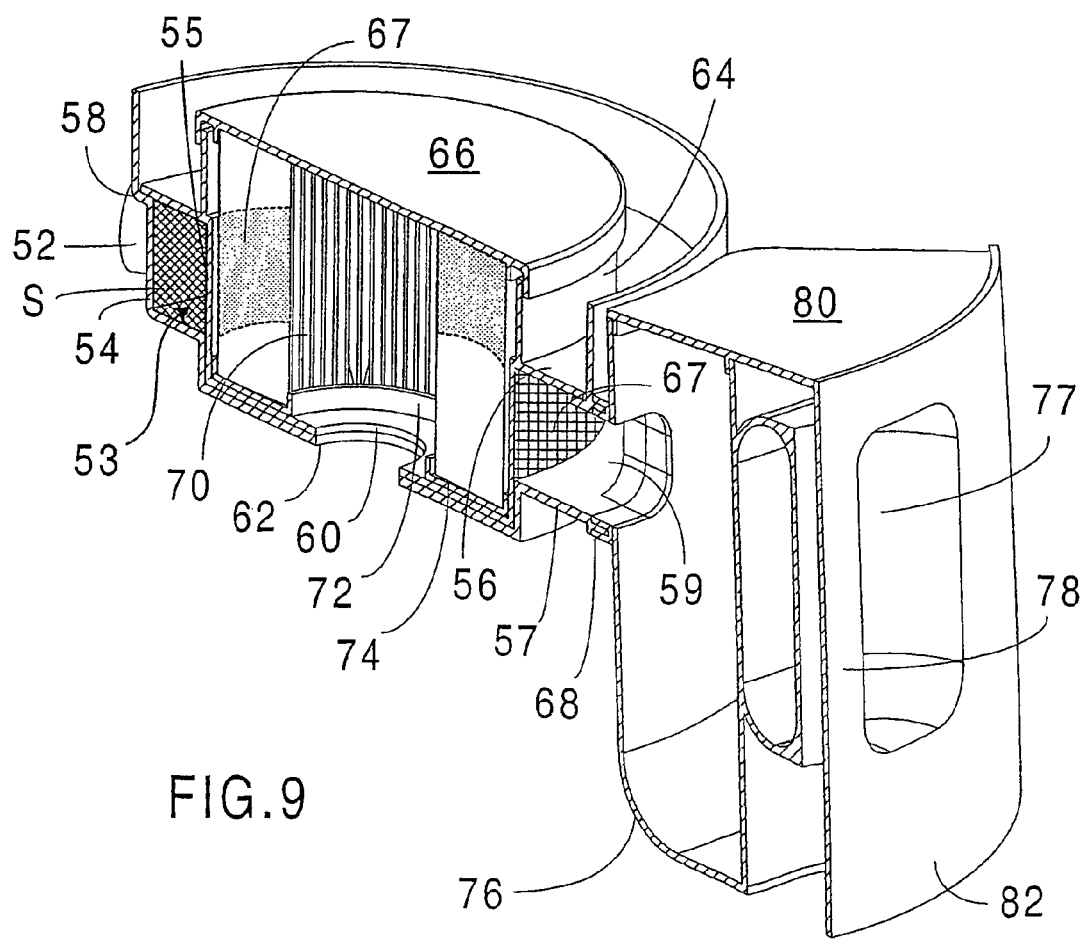
Figure 10:
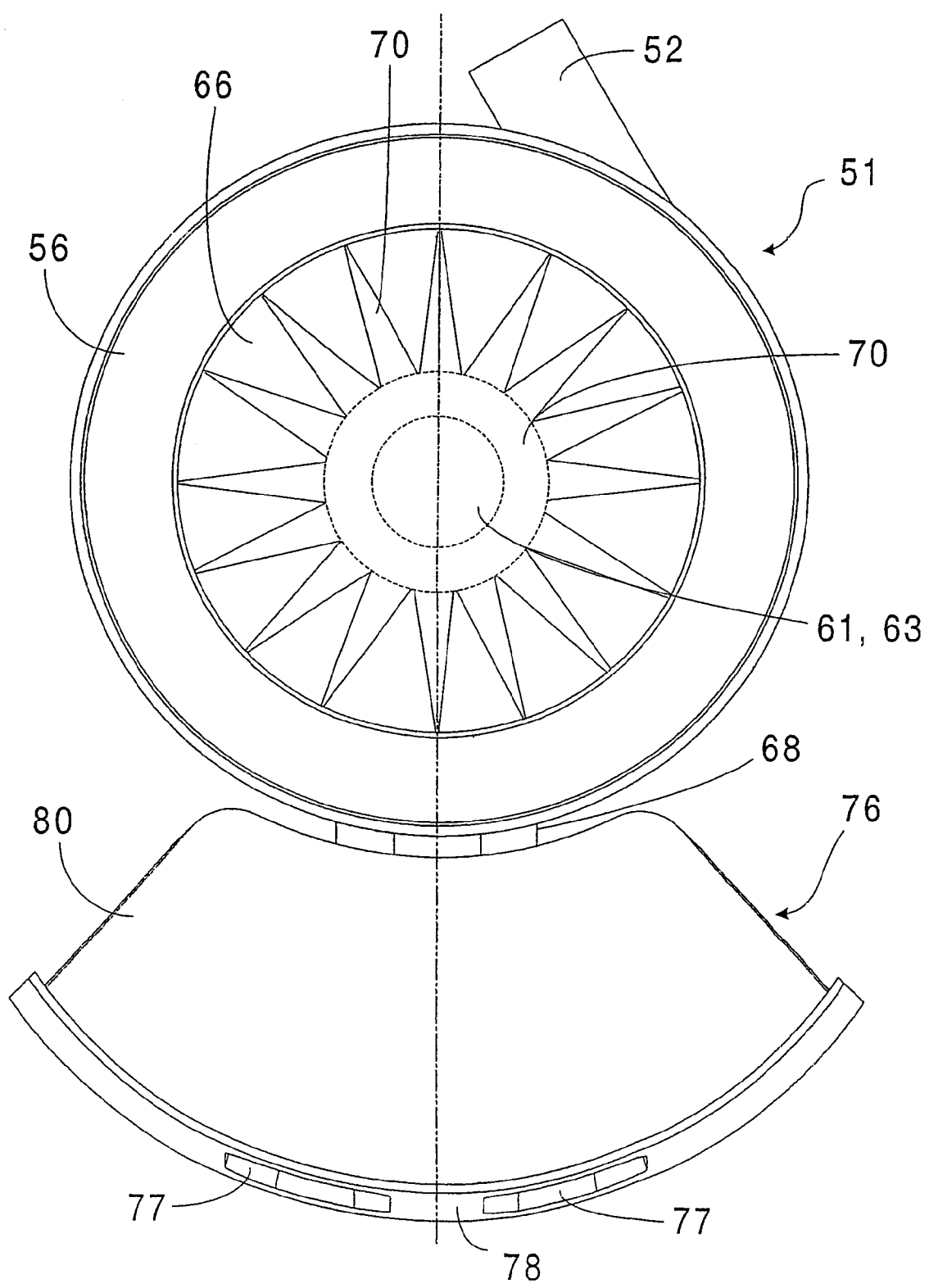
Figure 11:
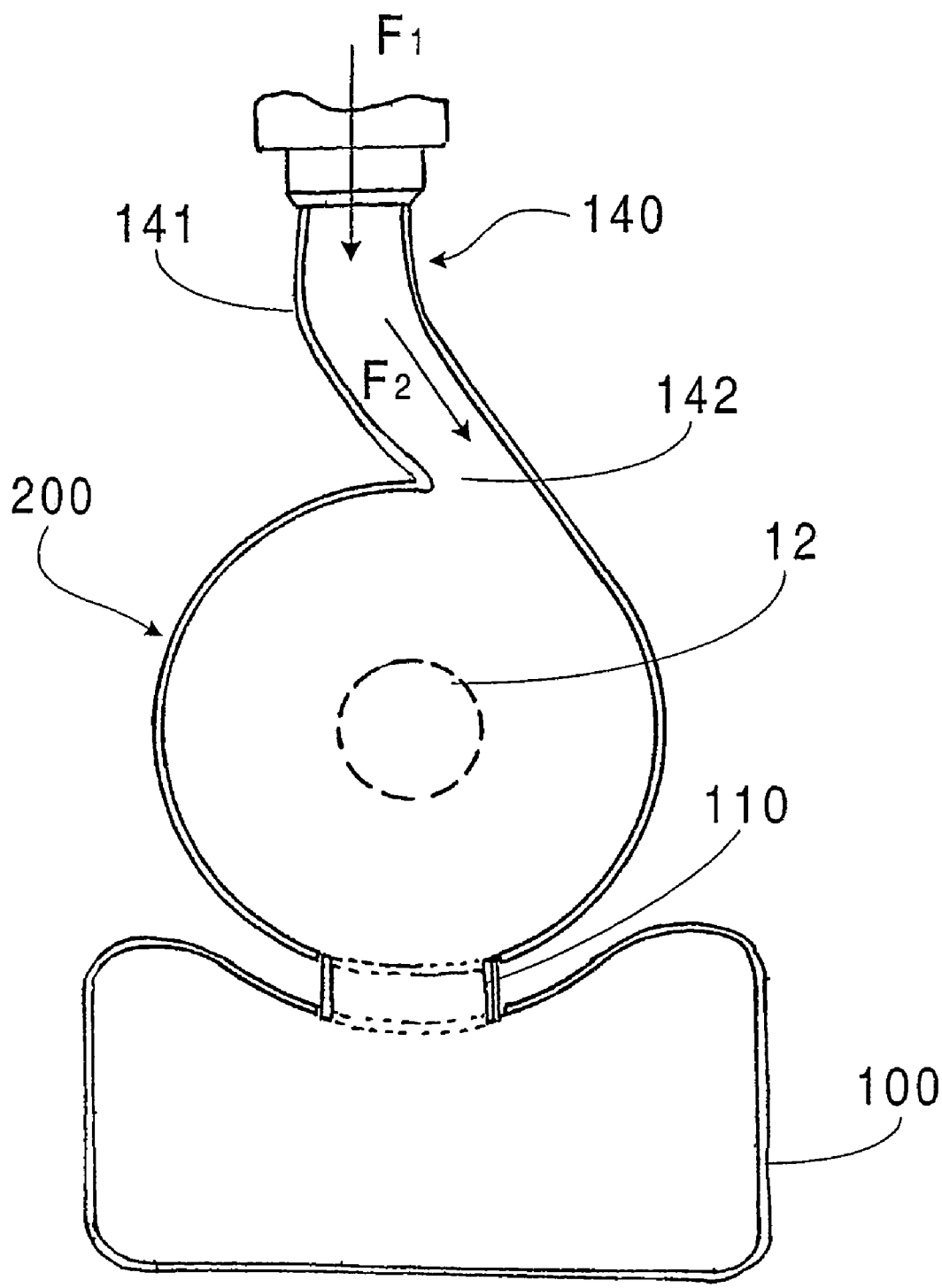
Figure 12:
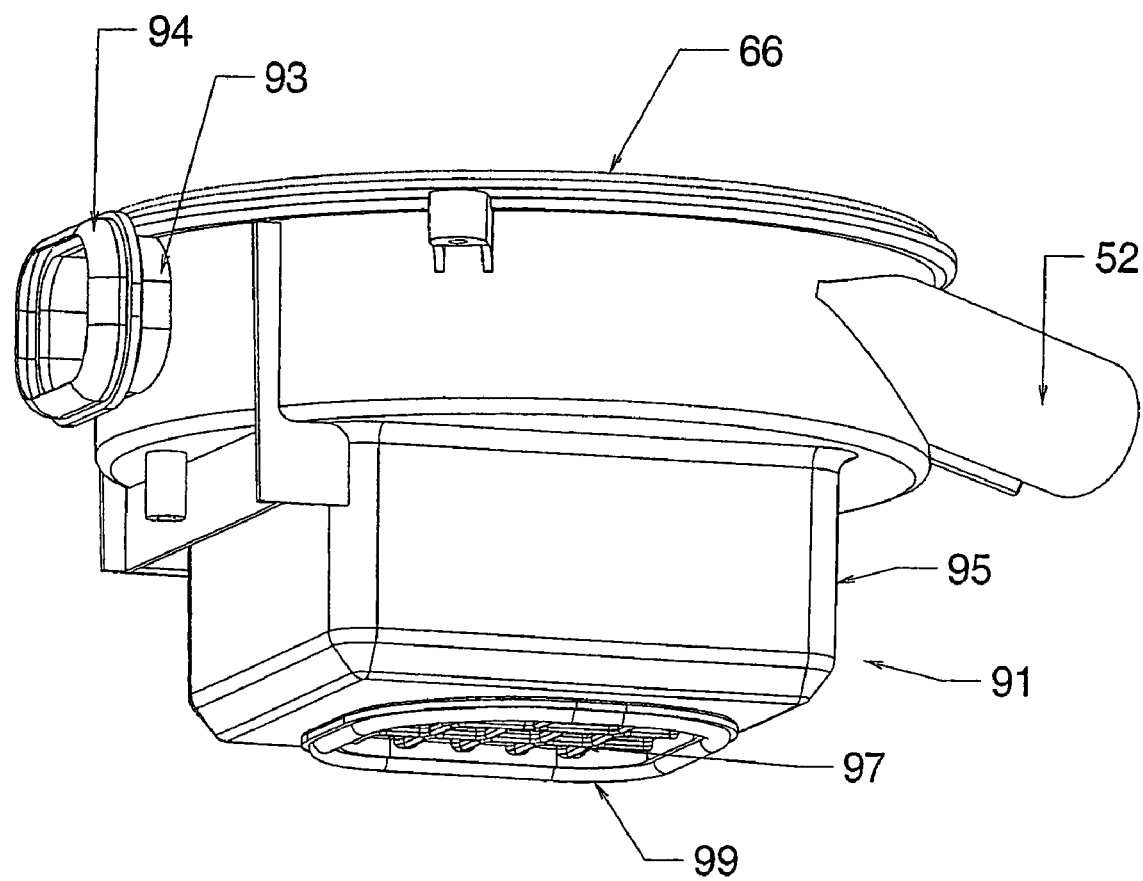

The present invention will be better understood with the aid of the description that will follow, in reference to the attached figures, among which:

FIGS. 1a and 1b show a view in cross-section, respectively from the top according to B—B and in profile according to the section A—A, of the general principle of the waste separation chamber according to the invention, FIGS. 2, 3 and 6 show conceptual variants, FIGS. 4a and 4b show the two isolated parts of an assembly for separation and collection of waste according to a first embodiment, FIG. 5 shows the device for separation and collection according to the first embodiment, in a perspective view, FIG. 7 shows a perspective view of a second embodiment of the present invention, FIG. 8 is a view in cross-section along axis L—L of FIG. 7, FIG. 9 is a perspective view of the cross-sectional view shown in FIG. 8, FIG. 10 is a view from above of the second embodiment, FIG. 11 is a schematic view from above of an improvement of the device according to the invention, FIG. 12 represents an advantageous variant of construction of the invention.

According to a diagram of conception illustrated in FIGS. 1a and 1b, the present invention consists of substantially circular chamber 2, having a radius R and a height h. A duct 4 for conveying waste arrives tangentially into this chamber.

At the center of this chamber is arranged an air outlet orifice opening into a duct in communication with a main suction group. A filter 12 is disposed at the level of orifice 11, between the duct and the separation chamber.

This latter is equally in aeraulic communication with a recovery receptacle 10, through a small duct 8 forming a radial opening.

This opening is in effect substantially radial in order to limit swirling in the tank. It can have a small tangential component, in the sense of rotation of the waste, in order to facilitate introduction of the waste into said tank.

Duct 4 for intake of the waste is, according to a standard configuration, of cylindrical form and is typically constituted by a tube similar to the tubes that allow connection of the vacuum cleaner nozzle to the vacuum cleaner body.

In a variant, this duct can have a cross-section smaller than those of the connection tubes in order to accelerate the entering air stream.

One of the particularities of the device is, on the one hand, that it presents a waste collecting tank 10 separable and independent from separation chamber 2. On the other hand, the chamber for separation of the waste has the characteristic of being of small height with respect to its radius R. In effect, the height h of the chamber is close to the diameter of duct 4 for intake into the separation chamber, which is between 25 and 35 mm, while the radius R of the separation chamber is, preferably, comprised between 40 mm and 100 mm.

This particularity permits the avoidance of an unduly large loss of speed of the centrifuged waste, which would reduce the efficiency of their separation from the main air stream.

Thus, duct 8 for outlet of waste toward the collecting tank is situated at the same level, in the separation chamber, as intake duct 4. This idea is obviously to be considered by disposing the height h of the chamber vertically while, depending on the configuration of the appliance, said chamber can occupy different positions other than horizontal.

In operation, air loaded with waste arrives tangentially from duct 4 in the direction F. The heaviest waste, placed in rotation are centrifuged. The air leaves at the center of said chamber in the direction J, after its passage through filter 12 in the direction K. The filtered air is then conveyed toward a main suction group by duct 14.

Dust and waste being plastered against the wall of the separation chamber, cannot effectuate like the air a change in direction to the center in order to exit. Their rotation on the inner face of the wall delimiting the chamber is led toward the radial opening through which they are evacuated toward the recovery receptacle 10, in the direction G.

Filter 12 can take on several variants of construction. It can be a matter of a simple planar grid, such as shown in FIG. 1b. This filer can equally be a hemispherical grid 120, as FIG. 2 shows. The mesh of the grid can be more or less wide.

In FIG. 2 is equally shown, in dotted lines, a variant of construction consisting of disposing a second grid 121 facing the first 120, said second grid being coupled with an aeraulic duct 15 connected to the suction group. In order to simplify construction, the two ducts 14, 15 are connected together quickly in order to form only a single aeraulic connection with the suction group.

Thus, air leaves the separation chamber along two opposite directions along the axis, approximately in the central part of said chamber.

FIGS. 4a, 4b and 5 show a more concrete form of construction of this latter configuration.

According to this form of construction, the assembly formed by waste separation chamber 31, tank 37 for collecting separated waste, as well as the ducts for intake of waste 33 and outflow of air 35 are constituted by two sub-assemblies produced by molding, these two sub-assemblies being substantially identical and assembled, in a sealed manner to one another by any known means, such as screws, or, as represented, by elastic interlocking 41 of the mortise-tenon type, in such a manner that the two sub-assemblies can be separated easily for cleaning.

Each sub-assembly is shown, seen from the inside, respectively in FIGS. 4a and 4b.

Thus, the portions 30a, 30b define substantially cylindrical separation chamber 31. At the center of each of them is arranged an opening 38a, 38b in respective communication with parts 34a, 34b defining air outlet duct 35. At the level of each orifice is disposed a filter and/or a grid, not shown, such as has been previously explained.

Air inlet duct 33 is defined by portions 32a, 32b opening tangentially into separation chamber 31. Waste separated by centrifuging is collected in receptacle 37 constituted by two elements 36a, 36b. Receptacle 37 is connected in an aeraulic manner to the separation chamber by a duct 40 delimited by walls 39a, 39b oriented in a substantially radial manner with respect to separation chamber 31. These walls 39a, 39b penetrate slightly into receptacle 37 while forming a trap that prevents dust from leaving again.

The two sub-assemblies, substantially symmetrical while presenting a substantially flat assembly joint, clearly show that intake duct 33 for the suctioned air stream is at the same level as outlet duct 40 for separated waste, with respect to the height of the separation chamber such as has been previously defined.

In order to further reduce the size of the device, air outlet duct 35 has, immediately after each orifice 38a, 38b, a substantially 90° bend in such a manner that the air outlet duct is arranged substantially parallel to intake duct 33. In FIG. 5 is shown bend 42b of part 34b of duct 35.

Such a separation device thus presents a reduced size, notably in the direction x–x' of FIG. 5, direction perpendicular to the centrifuging plane. This reduction in size of the device is accentuated by the small diameter of the separation chamber which is possible owing to the small passage cross-section for air in the chamber, assuring a high speed for the air stream in said chamber.

This diameter is equally conditioned by the cross-section of the pipes for conducting waste into the separation chamber.

When a grid is used, it is associated with a means for filtration or retention of fine waste particles. This means can be disposed immediately after the grid or even more downstream of the aeraulic circuit, close to the motor. This means can be a filter, a sponge, a bag, . . .

In order to reduce turbulence and noise, there can be disposed, in the air outlet, after the filter or the grid, a volute to orient and deflect the air stream along a spiral portion.

FIG. 3 shows an advantageous variant of construction in which separation chamber 21 has an attached air intake duct 22 regulated by a valve 24 arranged at the end of duct 22 by a restoring means 26. This air intake attachment device permits better control of the operation of the separator under extreme utilizations, particularly when the user suddenly blocks the main air intake leading to the separation chamber. This valve can, however, be replaced by a second intake for air loaded with waste, when for example several suction zones are provided.

In the variant shown schematically in FIG. 6, separation chamber 20 is connected to one or two ducts 14, 15 for the outlet of air toward the main suction group such as explained with reference to FIG. 2. This duct or ducts are separated from separation chamber 20 by a cylindrical filter 122 disposed at the center of the chamber, over substantially the entire height of said chamber. This arrangement permits the surface area of the filter to be increased, which particularly reduces the risks of clogging.

Advantageously, the cross-section 43 of the air intake into the separation chamber is different from a circular cross-section. Said cross-section can be rectangular, such as shown, or even square, trapezoidal, oval, . . . The choice of a rectangular cross-section, rather than a circular cross-section, is to be able to separate to the maximum the waste from axis y–y' and thus from the central filter.

FIGS. 7–11 show a second embodiment of the invention on the concept of FIG. 6.

Thus, device 51 for separation of waste has an air intake duct 52 opening into a separation chamber 53 resembling a torus of rectangular diametral cross-section. This passage cross-section for the flow is delimited by an outer circular wall 54, an inner circular wall 55, an upper wall 56, as well as a bottom wall 57.

According to the example put forward, bottom wall 57 and outer wall 54 form part of a single piece having an outer profile in the form of an L. This piece has in addition a bottom wall 62. In a similar and complementary manner, upper wall 56 and inner wall 55 form part of a single piece forming an L. Bottom wall 60 of this latter is configured to come to nest into bottom wall 62 in a hollow of the preceding piece, in such a manner as to easily form torus 53, the L forms of the two pieces coming, one on the other, to constitute the rectangular cross-section of the torus. In addition, a shoulder 58 improves the formation of the torus by providing a support surface of upper wall 56.

Such a constitution and disposition of these pieces thus permits an easy disassembly and a simple and rapid washing of the pieces, since the totality of the surfaces constituting the separation chamber is easily accessible.

As presented, notably by the hatching in FIG. 9, the rectangular cross-section S of the separation chamber is in the vicinity of the smallest intake cross-section for waste from the nozzle, in order to conserve a high air stream velocity. BY way of example, the cross-section shown is rectangular, with dimensions of 25 mm by 35 mm, or a cross-section of the order of 875 mm$^2$, for a minimal intake cross-section of 490 mm$^2$, corresponding to a tube whose inner diameter is 25 mm. The ratio between the cross-section of the separation chamber and the smallest cross-section for intake of waste from the nozzle can extend from 1 to 4 times, depending on the configurations of the devices used.

According to the example set forth, inner wall 55 is open onto the inner space of said wall, by the intermediary of a filtration grid 67 which is attached to said wall by any known means.

The aeraulic connection to the main suction group is assured by substantially coincident openings 61, 63 arranged respectively in bases 60, 62 of the pieces forming the separation chamber and opening onto a duct not shown, connected with the suction group.

Inner wall 55 is advantageously prolonged vertically by a wall 64. The cylinder thus constituted is closed at the upper part by a lid 66 fitted onto wall 64 in a manner known per se.

In the space defined by inner wall 55, bottom wall 60 and lid 66 is disposed a cylindrical filter 70 supported by a base plate 72 that comes to bear on base 60. This cylindrical filter surrounds openings 61, 63 of bases 60, 62. Sealing means prevent air penetrating through the filtration grid 67 from passing through openings 61, 63 without being preliminarily filtered by cylindrical filter 70.

These sealing means can take on different forms, such as a toroidal joint disposed under base plate 72, and/or by the very nature of the base plate . . .

Such sealing means are equally present between upper wall 56 and shoulder 58, as well as between bases 60 and 62 and between inner wall 55 and bottom wall 57.

Base plate 72 has radial extensions 74 the dimensions of which coincide with the diameter of face 55, in such a manner that the positioning of filter 70 is automatically centered with respect to cylindrical face 55, due to said radial extensions. These latters can be continuous, constituting a disc. The sealing means can be disposed at the level of the radial extensions.

Advantageously, such as shown, filter 70 extends substantially over the entire height k of the cylinder delimited by walls 55, 64, and lid 66.

By substantially increasing the height for the housing of the filter, it is permitted to increase the filtration surface area, all while retaining a separation chamber of small volume which guarantees a good efficiency in the separation of waste.

Such a filter can offer a filtration surface area greater than 0.20 m$^2$. Such a surface area can be obtained by using pleated filters that permit the device to retain a compact form.

The grid in front of the filter has a surface area of the order of 100 cm$^2$.

Exit of the waste separated in chamber 53 is assured by a radial opening 59 in communication with a recovery tank 76 through the intermediary of a duct 68. This tank is removable from the separation chamber. It is substantially vertical, has a handle 78 that can be used in several embodiments. According to the example presented, a casing structure 82 comes to bear on the rear of recovery tank 76. This structure has recesses 77 thus forming handle 78.

Recovery tank 76 is provided with a lid 80. This latter is prolonged up to casing structure 82. This lid can be removable or articulated, in a manner to permit simple and easy evacuation of waste when the user desires to empty the waste contained in the tank.

In operation, the user turns on the main suction group, and vacuums waste on the floor to be cleaned with the aid of a duct terminated or not by a nozzle and connected to separation chamber 53 by duct 52. The flow of air loaded with waste then penetrates to the interior of the separation chamber with a speed close to 60 m/s, elevated speed obtained by the dimensional configuration of different parts of the device.

The heaviest waste pieces are then separated from the main air stream, by centrifuge effect, but equally by grid 67. They then penetrate, through opening 59 followed by duct 68, into collecting tank 76 where they are stored.

The air penetrating grid 67 is then filtered by cylindrical filter 70 which is a filter permitting a high filtration in order to halt the finest dust. The purified air is then directed toward the suction group through openings 61, 63 of bases 60, 62.

In a variant, bars in the form of blades can be disposed upstream of grid 67, with respect to the direction of the air stream, permitting the filtration quality to be increased while reducing the load losses.

FIG. 11 shows an additional variant permitting a better separation of the introduced waste. In effect, the present variant is distinguished from the preceding ones by the form of the duct 140 for introduction of waste into the separation chamber 200, duct which has a bend 141. By such a bend, the probability that certain waste, at the entry of duct 140, will directly impact on the central filter is reduced. This, the waste, introduced in the direction F1, is invariably deflected by bend 141 in the direction F2 and then undergoes the centrifuge force.

Moreover, tank 100 for recovery of the waste is spaced from chamber 200 by a duct 110 having a small but significant length, trapping in a certain manner the waste and preventing the air from rushing into tank 100, as has previously been explained.

FIG. 12 shows an advantageous version of the invention which differs from that shown in FIGS. 8 and 9 essentially by the arrangement of the elements.

Thus, air intake duct 52 of waste separation device 91 opens into a separation chamber belonging to a torus having a circular internal wall formed by a circular grid. This chamber has moreover a bottom wall as well as a lid 66. A duct 63 such as previously described leads to a tank, not shown, for collecting separated waste. A joint 94 permits a fluid tight seal with the tank to be assured.

According to this variant, the filter situated after the separation of waste in the chamber, such as filter 70 of FIGS. 8 and 9, is not situated at the interior of the chamber, but under it, in a housing 95 in aeraulic communication with, on the one hand the separation chamber, and on the other hand the motor, by a grid 97. A sealing joint 99 assures the connection with the motor.

By this arrangement, it is possible to reduce, compared the architecture presented in FIGS. 8 and 9, the diameter of the separation chamber. In addition, this configuration permits more latitude with regard to the dimensioning of the filter.

This manner of implementing the invention equally presents the advantage of highlighting the small height of the separation chamber with respect to waste intake duct 52. The cross-section of the separation chamber remains in a ratio of 0.6 to 2.4 times the smallest cross-section for conducting waste from the nozzle.

In order to increase the intake speed of the waste into the separation chamber, the cross-section of the conduit for conducting the waste can be locally reduced. A shown in FIG. 11, conduit 140 has a sort of springboard 142 at its end that is linked to the separation chamber, permitting, by the reduced cross-section, the speed to be increased and the separation of waste in the chamber to be improved.

The present invention thus offers a system that is extremely compact without altering the quality of filtration which necessitates high air stream velocities.

This quality is essentially achieved by maintaining a substantial velocity on the separation chamber, particularly by low values, on the one hand of the cross-section of passage of air into the separation chamber, and on the other hand of the cross-section of air intake 52.

The invention claimed is:

1. Main device for separating and collecting waste entrained by an air stream generated by a suction group of a vacuum cleaner, said device comprising an air intake channel (4, 33, 52, 140) and a waste separating chamber (2, 20, 31, 53, 200) defining an internal volume having substantially the shape of a cylinder having a constant height, said air intake channel emerging along a tangential direction into said waste separating chamber, in the central part of said chamber (2, 20, 31, 53, 200) is arranged at least one opening (11, 38a, 38b, 61, 63) emerging into a duct connected to the suction group, said chamber (2, 20, 31, 53, 200) having a channel (8, 40, 68, 110) for evacuating all waste flowing into said chamber along a radial direction, said channel (8, 40, 68, 110) being connected to a sealed tank (10, 37, 76, 100) collecting centrifuged waste, the air intake channel (4, 33, 52, 140) and the waste evacuating channel (8, 40, 68, 110) being arranged substantially at the same height in the waste separating chamber (2, 20, 31, 53, 200), characterized in that the diametral cross-section of the chamber (2, 20, 31, 53, 200) is comprised between two times and ten times the smallest cross-section of the channels carrying waste in said device.

2. Main device for separating and collecting waste according to claim 1, characterized in that at least one filtration means (12, 67, 70, 120, 121, 122) is disposed in the central part of the chamber (2, 20, 31, 53, 200) and separates the internal volume of said chamber from the opening (11, 38a, 38b, 61, 63) connected with the suction group.

3. Main device for separating and collecting waste according to claim 1, characterized in that the end of the waste evacuating channel (8, 40, 68, 110) connected to the separation chamber has a height substantially equal to that of the chamber (2, 20, 31, 53, 200).

4. Main device for separating and collecting waste according to claim 1, characterized in that the cross-section of the intake channel (4, 33, 52, 140) is substantially circular and of a diameter comprised between 25 mm and 35 mm.

5. Main device for separating and collecting waste according to claim 4, characterized in that the channel (4, 33, 52, 140) for intake of air into the separation chamber has a reduction of its cross-section at the level of the aeraulic connection with said separation chamber (2, 20, 31, 53, 200).

6. Main device for separating and collecting waste according to claim 1, characterized in that the cross-section of the air intake channel is comprised between 1 and 2 times the smallest cross-section for conveying the waste in said device.

7. Main device for separating and collecting waste according to claim 2, characterized in that at least one of the filtration means (12) is flat.

8. Main device for separating and collecting waste according to claim 2, characterized in that at least one of the filtration means (120) is hemispherical.

9. Main device for separating and collecting waste according to claim 2, characterized in that two filtration means (120, 121) are disposed facing one another, in relation with two ducts (14, 15) linked to the main suction group.

10. Main device for separating and collecting waste according to claim 2, characterized in that at least one filtration means (122) is cylindrical.

11. Main device for separating and collecting waste according to claim 10, characterized in that the cylindrical filtration means (122) extends from the bottom of the separation chamber (2, 20, 31, 200) up to the upper part of said chamber.

12. Main device for separating and collecting waste according to claim 1, characterized in that the cylindrical separation chamber (53) is in the form of a torus, the inner cylindrical face (55) of which has an opening (61) that opens onto a duct in communication with a suction group.

13. Main device for separating and collecting waste according to claim 12, characterized in that a filtration means (67) is disposed at the level of the opening of the inner cylindrical face (55).

14. Main device for separating and collecting waste according to claim 12, characterized in that the diametral cross-section (S) of the torus is comprised between one time and four times the smallest cross-section of the channels conducting the waste in said device.

15. Main device for separating and collecting waste according to claim 13, characterized in that the filtration means (67) is a grid of which the mesh size is smaller than 60 μm.

16. Main device for separating and collecting waste according to claim 13, characterized in that the inner cylindrical face is extended above the height (h) of the separation chamber (53), the cylinder thus characterized being closed by substantially horizontal walls (60, 66), defining a volume at the interior of which is housed a further filtration means (70) communicating with the main suction group.

17. Main device for separating and collecting waste according to claim 16, characterized in that the further filtration means (70) is a cylindrical filter extending over substantially all of the height (k) of the cylinder.

18. Main device for separating and collecting waste according to claim 13, characterized in that said device has a further filtration means in the form of a filter disposed in a housing (95) situated under the separation chamber and in aeraulic communication therewith.

19. Main device for separating and collecting waste according to claim 18, characterized in that the further filtration means has a surface area greater than 0.2 m².

20. Main device for separating and collecting waste according to claim 19, characterized in that the further filtration means is a pleated filter.

21. Main device for separating and collecting waste according to claim 2, characterized in that at least one of the filtration means (12, 67, 70, 120, 121, 122) can be renewed.

22. Main device for separating and collecting waste according to claim 21, characterized in that the filtration means (12, 67, 70, 120, 121, 122) being able to be renewed is constituted by a fibrous support covered with a porous membrane of PTFE.

* * * * *